(12) United States Patent
Sakaki

(10) Patent No.: US 7,362,519 B2
(45) Date of Patent: Apr. 22, 2008

(54) OPTICAL UNIT

(75) Inventor: Takeshi Sakaki, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/101,675

(22) Filed: Apr. 8, 2005

(65) Prior Publication Data

US 2005/0231827 A1    Oct. 20, 2005

(30) Foreign Application Priority Data

Apr. 20, 2004    (JP) .............................. 2004-124490

(51) Int. Cl.
*G02B 7/02* (2006.01)

(52) U.S. Cl. ...................... 359/811; 359/813; 359/815; 359/819; 359/822; 359/823

(58) Field of Classification Search ................ 359/819, 359/821, 822, 823, 827, 811, 813, 815
See application file for complete search history.

(56) References Cited

U.S. PATENT DOCUMENTS 4,920,460 A * 4/1990 Mori ........................... 362/496
5,177,641 A * 1/1993 Kobayashi et al. ......... 359/820
5,781,351 A   7/1998 Murakami
5,798,876 A * 8/1998 Nagano ....................... 359/819
2003/0095344 A1* 5/2003 Ito et al. ..................... 359/811

FOREIGN PATENT DOCUMENTS

| CN | 1148713 | 4/1997 |
| JP | 2004-004566 | * 2/2003 |
| JP | 2004-0045666 | * 2/2003 |
| JP | 2004-4566 | 1/2004 |

* cited by examiner

*Primary Examiner*—Ricky Mack
*Assistant Examiner*—Brandi N Thomas
(74) *Attorney, Agent, or Firm*—Jordan and Hamburg LLP

(57) ABSTRACT

To overcoming any inconvenience in an optical unit, caused by a protrusion (burr) formed on a plastic lens when the plastic lens is molded, an optical unit is provided and has an injection molded plastic lens and a lens barrel. The injection molded plastic lens is fitted in a lens housing groove of the lens barrel so that a protrusion on one side of a flange of the injection molded plastic lens is located outside the lens housing groove.

16 Claims, 3 Drawing Sheets

FRONT SIDE — REAR SIDE

OPTICAL UNIT

FIELD OF THE INVENTION

This invention is an optical unit having a plastic lens fitted therein.

BACKGROUND OF THE INVENTION

An optical unit such as a cellular phone having an imaging device is known as an example including a lens fitted in a lens barrel (see JP-A-2004-4566 (FIG. 2)).

The lens used in such an optical unit is often a plastic lens formed from a plastic material by injection molding, which is a method suitable for mass production. As shown in FIG. 6, the molding of such a plastic lens is carried out by injecting a plastic material into a cavity 104 defined between a stationary mold 101 having a stationary core 100 for giving an accurate finish to the convex side of a lens and a movable mold 103 having a movable core 102 for giving an accurate finish to its concave side, whereby a plastic lens 1 as shown in FIG. 7 is molded. It has been the case that the plastic lens 1 as molded has a protrusion (e.g., a burr) 1A formed between the molds 101 and 103, as shown in FIG. 8. This is unavoidable due to the construction of the molds.

The protrusion 1A is unavoidably formed on the plastic lens 1, as stated above, and when that portion is not taken into consideration in designing a lens barrel, it is likely that a diametrical force may act on the lens and cause axial deviation or strain inside the lens, thereby lowering its optical performance.

SUMMARY OF THE INVENTION

An object of an illustrative, non-limiting embodiment of the invention is to provide an optical unit overcoming any inconvenience caused by a protrusion on a plastic lens. Also, the invention is not required to overcome the disadvantage described above, and an illustrative, non-limiting embodiment of the invention may overcome a different disadvantage or may not overcome any disadvantages.

The invention includes a plastic lens molded by an injection molding process (i.e., an injection molded plastic lens) and a lens barrel having a lens housing groove. The injection molded plastic lens has a flange having a protrusion (e.g., a burr) formed on one side of the flange (e.g., on a rear side of the flange). The injection molded plastic lens is fitted in the lens housing groove so that the protrusion is located (or situated) outside the lens housing groove.

When two lenses are fitted (that is, a first plastic lens and a second plastic lens, each molded by an injection molding process, are fitted in a lens barrel), a first lens housing groove and the second lens housing groove are formed in the lens barrel in which the second lens housing groove is formed behind the first lens housing groove and has a larger diameter than the first lens housing groove. The first plastic lens is fitted in the first lens housing groove in the above-described manner, and the second plastic lens is fitted in the second housing groove so that a front surface of the second plastic lens comes in contact with a rear surface of the first plastic lens and a protrusion edge on a rear side of a flange of the second plastic lens is located on a tapered edge of the second lens housing groove, wherein the tapered edge is chamfered so that the second lens housing groove has a lens receiving opening widened outside.

According to the invention, a lens barrel has a lens housing groove designed so that a protrusion (burr) on a plastic lens is located outside the lens housing groove, to thereby eliminate the possibility of any diametrical force being exerted on the plastic lens by the protrusion and causing axial deviation or strain inside the plastic lens and to thereby prevent any lowering in optical performance.

Moreover, there can be obtained a small and wide-angled optical unit having a high optical accuracy without having any axial deviation, etc., since a second lens housing groove is formed behind the above-described lens housing groove (a first lens housing groove) and has a larger diameter than the first lens housing groove, and a second plastic lens having a protrusion on a rear side of a flange of the second plastic lens is fitted in the second lens housing groove so that the second plastic lens comes in contact with a rear surface of the first plastic lens, and the protrusion is located on a tapered edge of the second lens housing groove, the tapered edge being chamfered so that the second lens housing groove has a lens receiving opening widened outside.

In accordance with the present invention an optical unit is provided comprising a plastic lens and a lens barrel. The plastic lens is molded by injection molding and has a front side, a rear side and an edge surface extending axially from the rear side toward the front side. The edge surface has a protrusion in the form of a burr extending radially outward adjacent the rear side of the lens. The lens barrel has a lens barrel front side having a lens aperture, and a lens barrel rear side. The lens barrel further has a first lens barrel portion disposed adjacent the lens aperture and defined by a first barrel interior wall having a first barrel diameter greater than a diameter of the lens aperture and defining a first barrel cavity into which a portion of the plastic lens is disposed, the first barrel interior wall extending axially from a front end to a rear end of the first barrel portion. The plastic lens is partially disposed in the first barrel portion with the first barrel interior wall engaging the edge surface of the plastic lens. The lens barrel has a second lens barrel portion disposed rearward of the first lens barrel portion, the second lens barrel portion being defined by a second barrel interior wall and having a front end proximate the first barrel interior wall, a rear end distal to the first barrel interior wall, and the second barrel interior wall having a second barrel diameter at at least a portion thereof greater than the first barrel diameter. The protrusion is disposed in the second lens barrel portion opposing the second barrel interior wall.

In accordance with a feature of the above embodiment the first plastic lens includes a flange portion upon which the edge surface is situated.

Yet another feature includes the lens barrel having a radially extending surface extending inward from the first barrel interior wall to form a corner at the front end of the first barrel portion, and the flange having a curved edge joining the front side and the edge surface and spaced from the corner at the front end of the first barrel portion.

A still further feature includes the lens barrel having a radially extending surface extending inward from the first barrel interior wall to form a corner at the front end of the first barrel portion, and the first plastic lens having a curved edge joining the front side and the edge surface and spaced from the corner at the front end of the first barrel portion.

Moreover, another feature of the present invention provides that the second barrel interior wall increases in diameter from a front end of the second barrel interior wall adjoining the first barrel interior wall to a rear end of the second barrel interior wall having the second barrel diameter. The second barrel interior wall can optionally be in the form of a straight chamfer.

Yet another feature of the present invention includes the plastic lens being a first plastic lens, a second plastic lens molded by injection molding, the second plastic lens having a front side, a rear side and an edge surface between the front side and the rear side, the edge surface having a protrusion extending radially outward at the rear side. The second plastic lens has a second lens diameter defined by the edge surface of the second plastic lens, the first plastic lens has a first lens diameter defined by the edge surface of the first plastic lens, and the second lens diameter is greater than the first lens diameter. The second plastic lens is partially disposed in the second barrel portion with the second barrel interior wall engaging the edge surface of the second plastic lens. The lens barrel has a third lens barrel portion disposed rearward of the second lens barrel portion, the third lens barrel portion being defined by a third barrel interior wall having a third barrel diameter at at least a portion thereof greater than the second barrel diameter. The protrusion of the second plastic lens is disposed in the third lens barrel portion opposing the third barrel interior wall. The front side of the second plastic lens contacts the rear side of the first plastic lens.

Furthermore, the above embodiment optionally provides that the barrel includes a radially extending surface extending inward from the second barrel interior wall toward of the first barrel interior wall and forms a corner at the front end of the second barrel portion.

Yet another feature of the above embodiment optionally provides that the second plastic lens includes a flange portion upon which the edge surface is situated, and the flange has a curved edge joining the front side and the edge surface and spaced from the corner at the front end of the second barrel portion.

Still another feature of the above embodiment optionally provides that the second plastic lens has a curved edge joining the front side and the edge surface and spaced from the corner at the front end of the second barrel portion.

Moreover, the present invention optionally provides a feature wherein the third barrel interior wall increases in diameter from a front end of the third barrel interior wall adjoining the second barrel interior wall to a rear end of the third barrel interior wall having the third barrel diameter. The third barrel interior wall optionally is in the form of a straight chamfer.

DETAILED DESCRIPTION OF THE INVENTION

An exemplary embodiment will now be described with reference to drawings.

Figure 1:
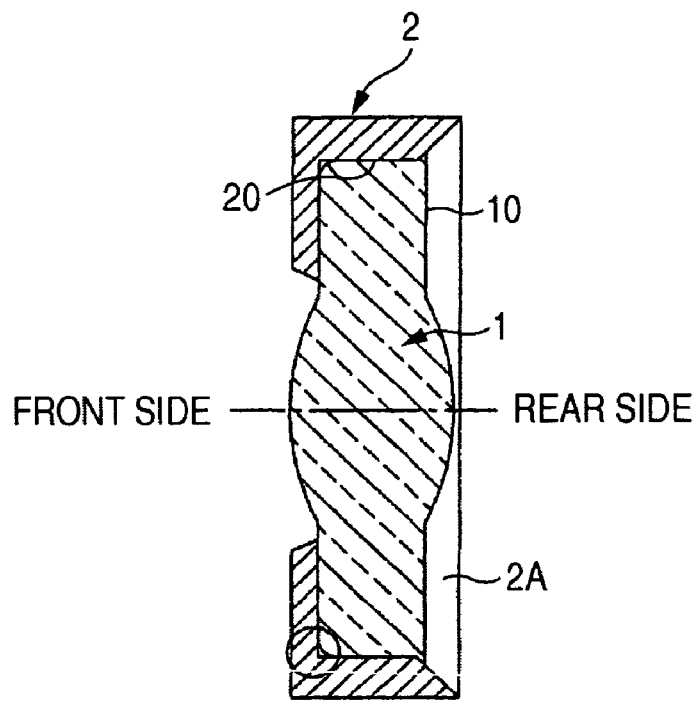
FIG. 1 shows a cross sectional view according to an illustrative, non-limiting embodiment of the invention.
Figure 2:
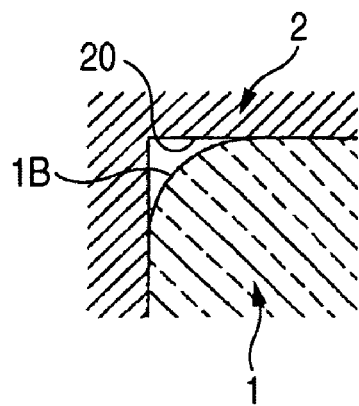
FIG. 2 shows an enlarged sectional view of part B in FIG. 1.
Figure 6:
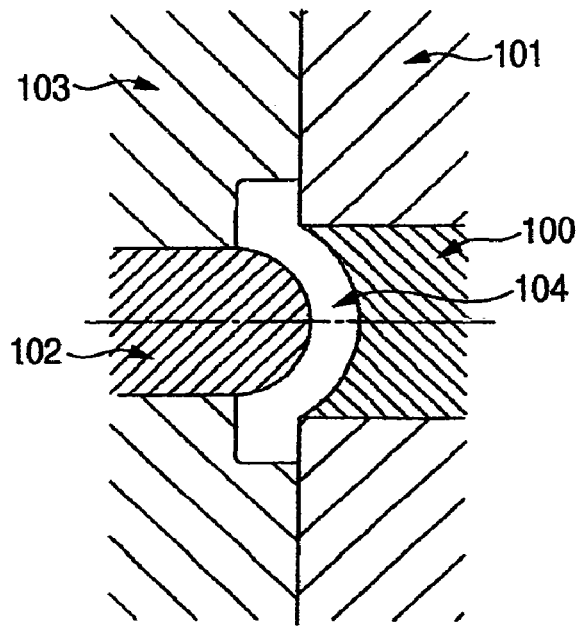
FIG. 6 shows a cross sectional view according to a mold for an injection molding process.
Figure 7:
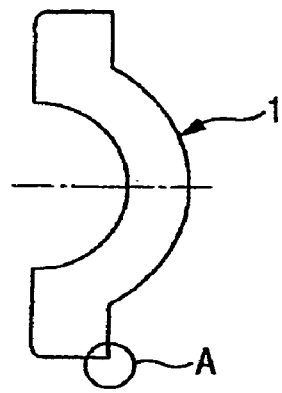
FIG. 7 shows a diagram showing a plastic lens as molded.
Figure 8:
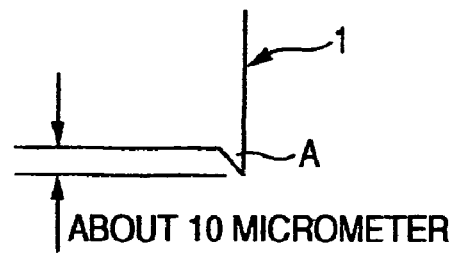
FIG. 8 shows an enlarged diagram of part A in FIG. 7.

According to the embodiment shown in FIG. 1, an injection molded plastic lens 1 having a protrusion 1A formed on one side (a rear side) of a flange 10 is fitted in the lens housing groove 20 of a lens barrel 2 so that the protrusion is located outside the lens housing groove 20. The flange 10 has a curved edge 1B formed on the other side (a front side) of the flange 10 (i.e., the opposite side to the side having the protrusion (burr) 1A), as shown in FIGS. 2 and 6, so that there is defined a small clearance between the curved edge 1B and the corner of the lens housing groove 20 in the lens barrel 2. When the side having the curved edge 1B is first fitted into the lens housing groove 20 through an opening 2A, the lens 1 can be installed in the lens barrel 2 smoothly. The curved edge 1B is detailed in FIG. 2.

Figure 3:
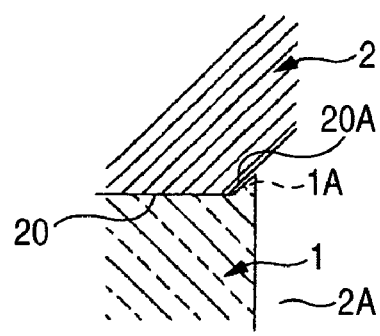
FIG. 3 shows an enlarged sectional view of the area in which a protrusion (burr) is formed.

FIG. 3 is an enlarged view showing details on the side having the protrusion 1A, in which a tapered edge 20A by chamfering so that the lens receiving opening 2A is widened outside, and the protrusion 1A of the plastic lens 1 is located on the tapered edge 20A. Even if the tapered edge 20A may not be formed, the protrusion 1A can be located outside the lens housing groove 20 when the lens housing groove 20 has a depth smaller than the thickness of the flange 10 of the plastic lens 1.

Figure 4:
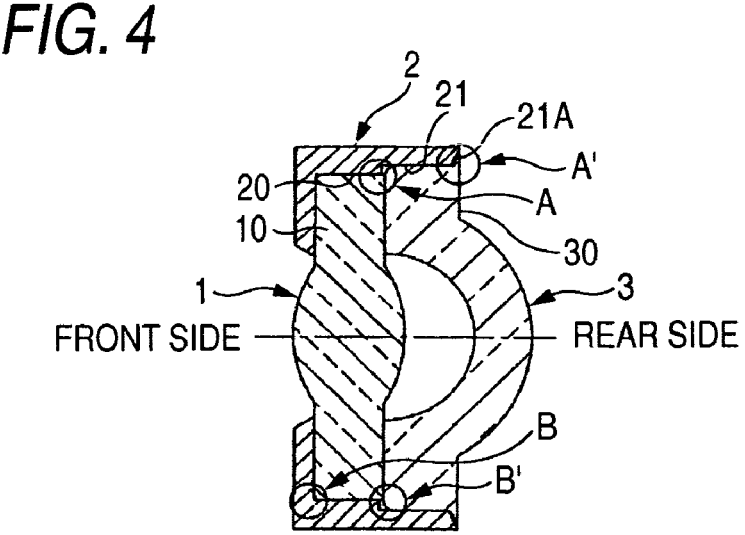
FIG. 4 shows a cross sectional view according to another illustrative, non-limiting embodiment of the invention.
Figure 5:
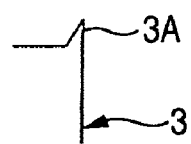
FIG. 5 shows an enlarged diagram showing part A' of FIG. 5.

FIG. 4 shows another exemplary embodiment of the invention, in which two plastic lenses 1 (i.e., a first plastic lens) and 3 (i.e., a second plastic lens) are employed, a lens housing groove 20 has a depth smaller than the thickness of the flange 10 of the plastic first lens 1 and a second lens housing groove 21 is formed behind the lens housing groove 20 and has a larger diameter than the lens housing groove 20, so that a protrusion 1A formed on the first plastic lens 1 is fitted inside a space defined by the difference in diameter between the lens housing grooves 20 and 21. The second plastic lens 3 is fitted in the second lens housing groove 21 and thereby installed in a lens barrel 2. A tapered edge 21A by chamfering so that the lens receiving opening of the lens barrel 2 (i.e., the lens receiving opening of the lens housing groove 21) is widened outside (like the one shown in FIG. 3), and the second plastic lens 3 has a protrusion 3A located on the tapered edge 21A. For the protrusion 3A, see FIG. 5. The embodiment shown in FIG. 4 can be a small and wide-angled optical unit having two lenses, which is beneficial for use with an imaging device in a cellular phone. The direct contact of protrusions 1A and 3A with the walls of housing grooves 20 and 21 in an optical unit having a combination of lenses causes axial deviation and thereby lowers the accuracy of optical performance and any error that may occur is greater than what occurs to a unit having only a single lens. According to an optical unit of the invention, the protrusions 1A and 3A on the plastic lenses 1 and 3 are located outside the first and second lens housing grooves, respectively, whereby the optical unit of the invention ensures a high degree of installation accuracy.

The entire disclosure of each and every foreign patent application from which the benefit of foreign priority has been claimed in the present application is incorporated herein by reference, as if fully set forth herein.

While the invention has been described in detail and with reference to specific embodiments thereof, it will be apparent to one skilled in the art that various changes and modifications can be made therein without departing from the spirit and scope thereof.

What is claimed is:

1. An optical unit comprising:
   a first plastic lens molded by an injection molding process, the first plastic lens comprising a flange having an outer circumference side surface and a protrusion edge on a rear portion of said outer circumferential side surface extending radially outward from said outer circumferential side surface; and a lens barrel having a first lens housing groove;

the first plastic lens being fitted in the first lens housing groove so that the protrusion edge is located outside the first lens housing groove;

a second plastic lens molded by the injection molding process, the second plastic lens comprising a flange having an outer circumference side surface and a protrusion edge an a rear portion of said outer circumferential side surface extending radially outward from said outer circumferential side surface;

the lens barrel having a second lens housing groove behind the first lens housing groove, wherein the second housing groove has a larger diameter than the first lens housing groove, and the second housing groove having a tapered edge, the tapered edge being chamfered so that the second lens housing groove has a lens receiving opening widened outside;

the second plastic lens being fitted in the second lens housing groove so that a front surface of the second plastic lens comes in contact with a rear surface of the first plastic lens; and the protrusion edge on said outer circumferential side surface of the flange of the second plastic lens being located on the tapered edge of the second lens housing groove.

2. The optical unit according to claim 1, wherein the flange of the first plastic lens has a curved edge on a front edge of the flange of the first plastic lens, and the flange of the second plastic lens has a curved edge on a front edge of the flange of the second plastic lens.

3. An optical unit comprising:
a plastic lens molded by an injection molding process, the plastic lens comprising a flange having an outer circumference side surface and a protrusion edge on a rear portion of said outer circumferential side surface extending radially outward from said outer circumferential side surface; and a lens barrel having a lens housing groove, wherein the housing groove has a tapered edge, and the tapered edge is chamfered so that the lens housing groove has a lens receiving opening widened outside, wherein the plastic lens is fitted in the lens housing groove so that the protrusion edge is located on the tapered edge of the lens housing groove.

4. The optical unit according to claim 3, wherein the flange has a curved edge on a front edge thereof.

5. An optical unit comprising:
a plastic lens molded by injection molding, the plastic lens having a front side, a rear side and an edge surface extending axially from said rear side toward said front side, said edge surface having a protrusion in the form of a burr extending radially outward adjacent said rear side of the lens;

a lens barrel having a lens barrel front side having a lens aperture, and a lens barrel rear side;

said lens barrel having a first lens barrel portion disposed adjacent said lens aperture and defined by a first barrel interior wall having a first barrel diameter greater than a diameter of said lens aperture and defining a first barrel cavity into which a portion of said plastic lens is disposed, said first barrel interior wall extending axially from a front end to a rear end of said first barrel portion;

said plastic lens being partially disposed in said first barrel portion with said first barrel interior wall engaging said edge surface of said plastic lens;

said lens barrel having a second lens barrel portion disposed rearward of said first lens barrel portion, said second lens barrel portion being defined by a second barrel interior wall and having a front end proximate said first barrel interior wall, a rear end distal to said first barrel interior wall, and said second barrel interior wall having a second barrel diameter at at least a portion thereof greater than said first barrel diameter; and said protrusion being disposed in said second lens barrel portion opposing said second barrel interior wall.

6. An optical unit according to claim 5 wherein said first plastic lens includes a flange portion upon which said edge surface is situated.

7. The optical unit according to claim 6, wherein:
said lens barrel has a radially extending surface extending inward from said first barrel interior wall to form a corner at said front and of said first barrel portion; and
said flange has a curved edge joining said front side and said edge surface and spaced from said corner at said front end of said first barrel portion.

8. The optical unit according to claim 5, wherein:
said lens barrel has a radially extending surface extending inward from said first barrel interior wall to form a corner at said front end of said first barrel portion; and
said first plastic lens has a curved edge joining said front side and said edge surface and spaced from said corner at said front end of said first barrel portion.

9. An optical unit according to claim 5 wherein said second barrel interior wall increases in diameter from a front end of said second barrel interior wall adjoining said first barrel interior wall to a rear end of said second barrel interior wall having said second barrel diameter.

10. An optical unit according to claim 9 wherein said second barrel interior wall is in the form of a straight chamfer.

11. An optical unit comprising:
a plastic lens molded by injection molding, the plastic lens having a front side, a rear side and an edge surface extending axially from said rear side toward said front side, said edge surface having a protrusion in the form of a burr extending radially outward adjacent said rear side of the lens;

a lens barrel having a lens barrel front side having a lens aperture, and a lens barrel rear side;

said lens barrel having a first lens barrel portion disposed adjacent said lens aperture and defined by a first barrel interior wall having a first barrel diameter greater than a diameter of said lens aperture and defining a first barrel cavity into which a portion of said plastic lens is disposed, said first barrel interior wall extending axially from a front end to a rear end of said first barrel portion;

said plastic lens being partially disposed in said first barrel portion with said first barrel interior wall engaging said edge surface of said plastic lens;

said lens barrel having a second lens barrel portion disposed rearward of said first lens barrel portion, said second lens barrel portion being defined by a second barrel interior wall and having a front end proximate said first barrel interior wall, a rear end distal to said first barrel interior wall, and said second barrel interior wall having a second barrel diameter at at least a portion thereof greater than said first barrel diameter;

said protrusion being disposed in said second lens barrel portion opposing said second barrel interior wall;

said plastic lens being a first plastic lens;

a second plastic lens molded by injection molding, the second plastic lens having a front side, a rear side and an edge surface between said front side and said rear side, said edge surface having a protrusion extending radially outward at said rear side;

said second plastic lens having a second lens diameter defined by said edge surface of said second plastic lens, said first plastic lens having a first lens diameter defined by said edge surface of said first plastic lens, and said second lens diameter being greater than said first lens diameter;

said second plastic lens being partially disposed in said second barrel portion with said second barrel interior wall engaging said edge surface of said second plastic lens;

said lens barrel having a third lens barrel portion disposed rearward of said second lens barrel portion, said third lens barrel portion being defined by a third barrel interior wall having a third barrel diameter at at least a portion thereof greater than said second barrel diameter;

said protrusion of said second plastic lens being disposed in said third lens barrel portion opposing said third barrel interior wall; and said front side of the second plastic lens contacting said rear side of said first plastic lens.

12. An optical unit according to claim 11 wherein said barrel includes a radially extending surface extending inward from said second barrel interior wall toward of said first barrel interior wall and forms a corner at said front end of said second barrel portion.

13. An optical unit according to claim 12 wherein:

said second plastic lens includes a flange portion upon which said edge surface is situated; and said flange has a curved edge joining said front side and said edge surface and spaced from said corner at said front end of said second barrel portion.

14. The optical unit according to claim 12, wherein said second plastic lens has a curved edge joining said front side and said edge surface and spaced from said corner at said front end of said second barrel portion.

15. An optical unit according to claim 11 wherein said third barrel interior wall increases in diameter from a front end of said third barrel interior wall adjoining said second barrel interior wall to a rear end of said third barrel interior wail having said third barrel diameter.

16. An optical unit according to claim 15 wherein said third barrel interior wall is in the form of a straight chamfer.

* * * * *